United States Patent

Thweatt, Jr.

[11] Patent Number: 6,080,973
[45] Date of Patent: Jun. 27, 2000

[54] ELECTRIC WATER HEATER

[75] Inventor: Carlisle Thweatt, Jr., South Haven, Mich.

[73] Assignee: Sherwood-Templeton Coal Company, Inc., Indianapolis, Ind.

[21] Appl. No.: 09/294,765

[22] Filed: Apr. 19, 1999

[51] Int. Cl.[7] ................................................ H05B 1/02
[52] U.S. Cl. ........................ 219/497; 219/505; 219/501; 392/465; 392/485; 392/488; 392/544
[58] Field of Search .................................. 219/492, 497, 219/501, 505, 494; 392/465, 473, 485, 488, 489, 486, 497, 498, 544

[56] References Cited

U.S. PATENT DOCUMENTS

| | | | |
|---|---|---|---|
| 2,838,643 | 6/1958 | Elliot et al. ............................... | 219/20 |
| 2,847,548 | 8/1958 | Gordon, Jr. et al. ...................... | 219/38 |
| 2,868,944 | 1/1959 | Koch et al. ................................ | 219/38 |
| 2,879,371 | 3/1959 | Justiz ........................................ | 219/39 |
| 4,524,264 | 6/1985 | Takeuchi et al. ......................... | 219/497 |
| 4,595,825 | 6/1986 | Gordbegli ................................. | 219/306 |
| 4,602,145 | 7/1986 | Roberts .................................... | 219/297 |
| 4,604,516 | 8/1986 | Metz ......................................... | 219/379 |
| 4,736,091 | 4/1988 | Moe .......................................... | 219/505 |
| 4,874,925 | 10/1989 | Dickenson ............................... | 249/301 |
| 5,324,917 | 6/1994 | Boyer et al. .............................. | 219/497 |
| 5,352,868 | 10/1994 | Denen et al. ............................. | 219/501 |
| 5,388,178 | 2/1995 | Moon ....................................... | 392/444 |
| 5,437,002 | 7/1995 | Bennett .................................... | 392/441 |
| 5,442,157 | 8/1995 | Jackson ................................... | 219/492 |
| 5,464,965 | 11/1995 | McGregor et al. ...................... | 219/497 |
| 5,545,877 | 8/1996 | Shelton .................................... | 219/497 |
| 5,555,725 | 9/1996 | Shimasaki et al. ....................... | 60/277 |
| 5,656,190 | 8/1997 | Aoki ........................................ | 219/505 |

*Primary Examiner*—Mark Paschall
*Attorney, Agent, or Firm*—Price, Heneveld, Cooper, DeWitt & Litton

[57] ABSTRACT

An electric water heater is provided which includes a polymeric body having an elongated hollow and an inlet opening and an outlet opening in communication with the hollow for flowing water to pass therethrough. An electrical resistance heater having a heating element of a material exhibiting a positive temperature coefficient of resistance is disposed in the hollow of the polymeric body and in heat transfer communication with water flowing through the hollow. An electrical source supplies electrical power to the heating element to generate heat. A controller senses current flow through the heating element and determines a resistance related value, such as current or resistance of the heating element. The controller also determines a first derivative of the resistance related value over time, and determines a second derivative of the resistance related value over time, and controls power supply to the heating element as a function of the first and second derivatives and/or absolute resistance.

26 Claims, 4 Drawing Sheets

FIG. 1

ELECTRIC WATER HEATER

BACKGROUND OF THE INVENTION

The present invention generally relates to electric water heaters and, more particularly, to a flow-through water heater and control system therefor.

Electric flow-through water heaters are commonly employed for use in heating circulating water for use in a spa/hot tub and other applications. Electric flow-through water heaters commonly employ an electrical heating element disposed in a metallic vessel such that the heating element is in contact with the flow of water to provide heat exchange to the water as it flows by the heating element. In addition, a water pump is generally used to continuously circulate water through the heater vessel. In the conventional water heating system, a thermostat is typically disposed within the hollow of the vessel to sense the temperature of the heated water, and the heating element is generally controlled based on the sensed water temperature. In one approach, an electrical resistance heater having a positive temperature coefficient of resistivity is employed to act as the temperature sensor as disclosed in U.S. Pat. No. 4,736,091. According to most conventional approaches, the electric heater is controlled in response to the sensed temperature of the water to maintain a desired water temperature.

In addition to controlling the heating element to maintain a predetermined water temperature, it is also desirable to ensure adequate operation of the water heater to prevent overheating or other abnormal conditions that could adversely affect the water heater. In particular, overheating could occur in the event that there is an inadequate amount of water present in the heater vessel due to an abnormally low water level, or in the event there is inadequate water flow through the heater vessel, such as can be caused by failure of the water pump or restricted water flow. In the event that such adverse conditions occurs, it is generally preferred to shut off the water heater to prevent damage to the water heater system. The earlier the detection of a potential problem, the more likely the prevention of any damage to the system.

It is therefore desirable to provide an electric heater and control therefor that quickly and efficiently detects and responds to abnormal conditions. In particular, it is desirable to provide an electric heater and control system that is able to quickly detect a dry fire condition and take corrective action to prevent adverse effects. It is also desirable to provide an electric flow-through water heater and control system that quickly detects a stagnant water condition and takes corrective action to prevent adverse effects. Yet, it is further desirable to provide an electric heater and controller that allows for use of a polymeric heater vessel.

SUMMARY OF THE INVENTION

In accordance with one aspect of the present invention, an electric heater is provided which includes a polymeric body having an elongated hollow and an inlet opening and an outlet opening in communication with the hollow for flowing fluid, e.g., water, to pass therethrough. An electrical resistance heater having a heating element of a material exhibiting a positive temperature coefficient of resistivity is disposed in the hollow of the polymeric body and in heat transfer communication with fluid flowing through the hollow. An input terminal receives electrical power and supplies the electrical power to the heating element to generate heat. A controller senses current flow through the heating element and determines a resistance related value of the heating element. The controller also determines a first derivative of the resistance related value over time, and determines a second derivative of the resistance related value over time, and controls power supply to the heating element as a function of the first and second derivatives.

According to another aspect of the present invention, a heater is provided comprising a polymeric body having an elongated hollow, and an inlet opening and an outlet opening in communication with the hollow for flowing fluid therethrough. An electrical heater having an electrical heating element is disposed in the hollow of the polymeric body and in heat transfer communication with fluid flowing through the hollow, and an input terminal receives electrical power and supplies the electrical power to the heating element to produce current in the heating element to generate heat. A conductive support member supports the electrical heating element in the hollow and is in direct contact with an outer conductive jacket of the heating element so that the support member mechanically supports the heating element and collects any stray current in the fluid. A ground fault detector is in electrical contact with the outer conductive coating of the heating element and detects currents collected by the conductive support member. A controller is also provided to shut off power to the electrical heating element in the event that a ground fault detection condition is detected. According to a further aspect of the invention, the heating element has a pair of terminals which extend through apertures in the polymeric body and compression fittings thermally and electrically isolate the terminals from the polymeric body.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
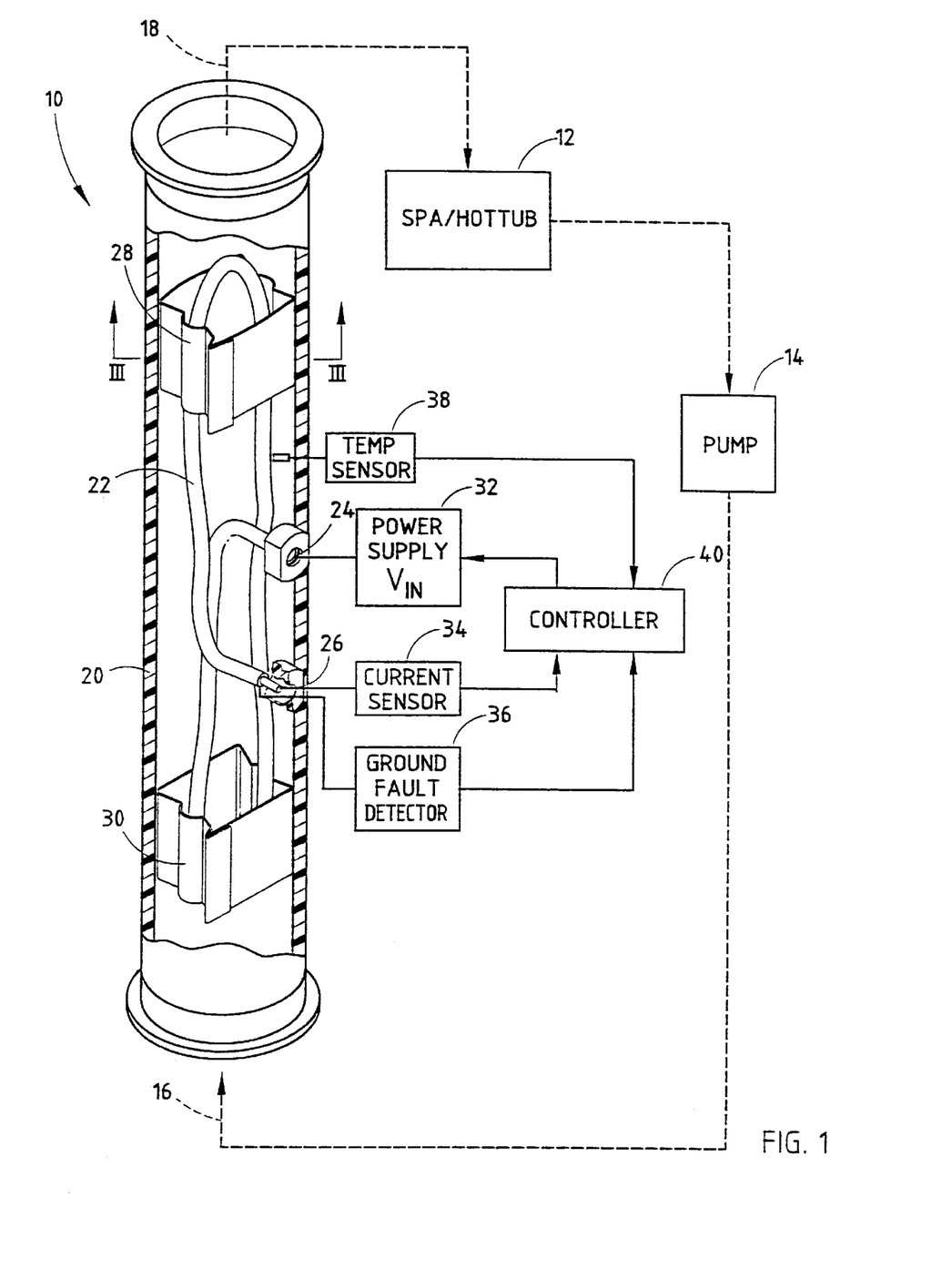
FIG. 1 is an elevational cross-sectional view taken through a section of an electric water heater used in a water heating application according to the present invention.

Referring to FIG. 1, an electric flow-through water heater 10 is illustrated therein for heating water for use in a spa/hot tub 12. Water from the spa/hot tub 12 is circulated by way of a pump 14 into the inlet 16 of water heater 10. During normal operation, the circulating water is heated as it flows past an electric heating element 22 in the heater 10. The heated water then flows out of the outlet 18 and back into the spa/hot tub 12. While the water heater 10 is illustrated and described herein for use in connection with a spa/hot tub 12, it should be appreciated that the flow-through water heater 10 may be used in various other applications to heat water, other liquids or fluids.

The heater 10 includes a hollow vessel preferably in the shape of a cylinder and made of polymeric material, such as polyvinyl chloride (PVC). The vessel 12 has a hollow extending from the inlet 16 to the outlet 18 through which water is circulated. The electrical heating element 22 is located in the hollow of vessel 20 and held in place on opposite ends via metal support members 28 and 30. Metal support members 28 and 30 mechanically stabilize and position the electrical heating element 22 within the vessel to prevent the electrical heating element 22 from contacting and damaging the polymeric walls of the vessel 20.

The electrical heating element 22 has an appreciable positive temperature coefficient of resistance and provides a noticeable change in resistance in response to changes in temperature. The electrical heating element generally includes an electrically insulated conductor preferably constructed from materials such as iron, Balco, platinum, aluminum, tungsten, or like materials which have an appreciable positive temperature coefficient of resistance. An example of a heater having an appreciable positive temperature coefficient of resistivity is disclosed in U.S. Pat. No. 4,736,091, which is hereby incorporated by reference. According to the present invention, various responses to a change or absolute value of resistance can be used to shutdown, cutout, or reduce voltage to the heater to prevent overheating, control temperature of the water medium being heated, or indirectly measure the flow rate which correlates to the heat transfer from the heater. As the electric heating element 22 increases in temperature, the resistance of the heating element likewise increases. For example, the heating element can be designed to change in resistance from 9.6 ohms to over 30 ohms for a temperature increase of 400° F. to 1800° F. By programming the controller to sense the heater resistance, or current draw at a given voltage, the controller can take preventive action to prevent damage to the system, due to an abnormal overheat condition, quicker than known existing heater protection systems.

The electrical heating element 22 is shown configured in the shape of an elongated loop. However, the heating element 22 may be configured in any number of shapes and sizes which include but are not limited to a double loop configuration, or a helical coil configuration. In any event, the electrical heating element 22 has two terminals 24 and 26 which extend through openings formed in the polymeric vessel 20. Terminal 24 serves as an input terminal and is connected to a power supply 32 which supplies a voltage input $V_{IN}$. Terminal 26 serves as an output terminal and is connected to a current sensor 34 for sensing current passing through the heating element 22. The sensed current is in turn input to a controller 40 which may compute the resistance of the heating element 22 and use the resistance or current value to detect abnormal conditions.

The electric flow-through water heater 10 may also include a separate temperature sensor 38 for providing a temperature reading of the water flowing through the vessel 20. The temperature sensed by sensor 38 is preferably used to determine the amount of heating required to maintain a desired water temperature. Also included in the system is a ground fault detector 36 which is bonded or electrically connected to the outer conductive jacket of the electrical heating element. The outer jacket of the heating element 22 is conductive and is dielectrically isolated from the inner electrical current line (PTC resistor) that is electrically charged during normal operation. The ground fault detector 36 serves to collect and detect any stray currents which are picked up within the vessel 20 and collected by support members 28 and 30 and the outer conductive jacket of the heating element 22.

The controller 40 receives as inputs the temperature sensed by temperature sensor 38, the current measured by current sensor 34, and a signal from the ground fault detector 36. The controller 40 provides a control signal to control the power supply 32, i.e., the voltage input $V_{IN}$, by adjusting the voltage input $V_{IN}$ in response to the sensed water temperature to maintain a predetermined water temperature. The controller 40 also serves to turn off the power supply 32 to cutoff the current supplied to the heating element 22 during certain abnormal conditions. The controller 40 may utilize the temperature measured by temperature sensor 38 to provide normal operating power supply control to maintain the predetermined water temperature. According to the present invention, the controller 40 monitors the current sensed by current sensor 34, and uses either the sensed current or a resistance value computed as a function of the supply voltage $V_{IN}$ and sensed current to determine an abnormal condition. Based on certain determined conditions, the controller 40 provides a safety shut off to shut off the power supply to the electrical heating element 22 when certain abnormal conditions are detected.

Figures 2, 3:
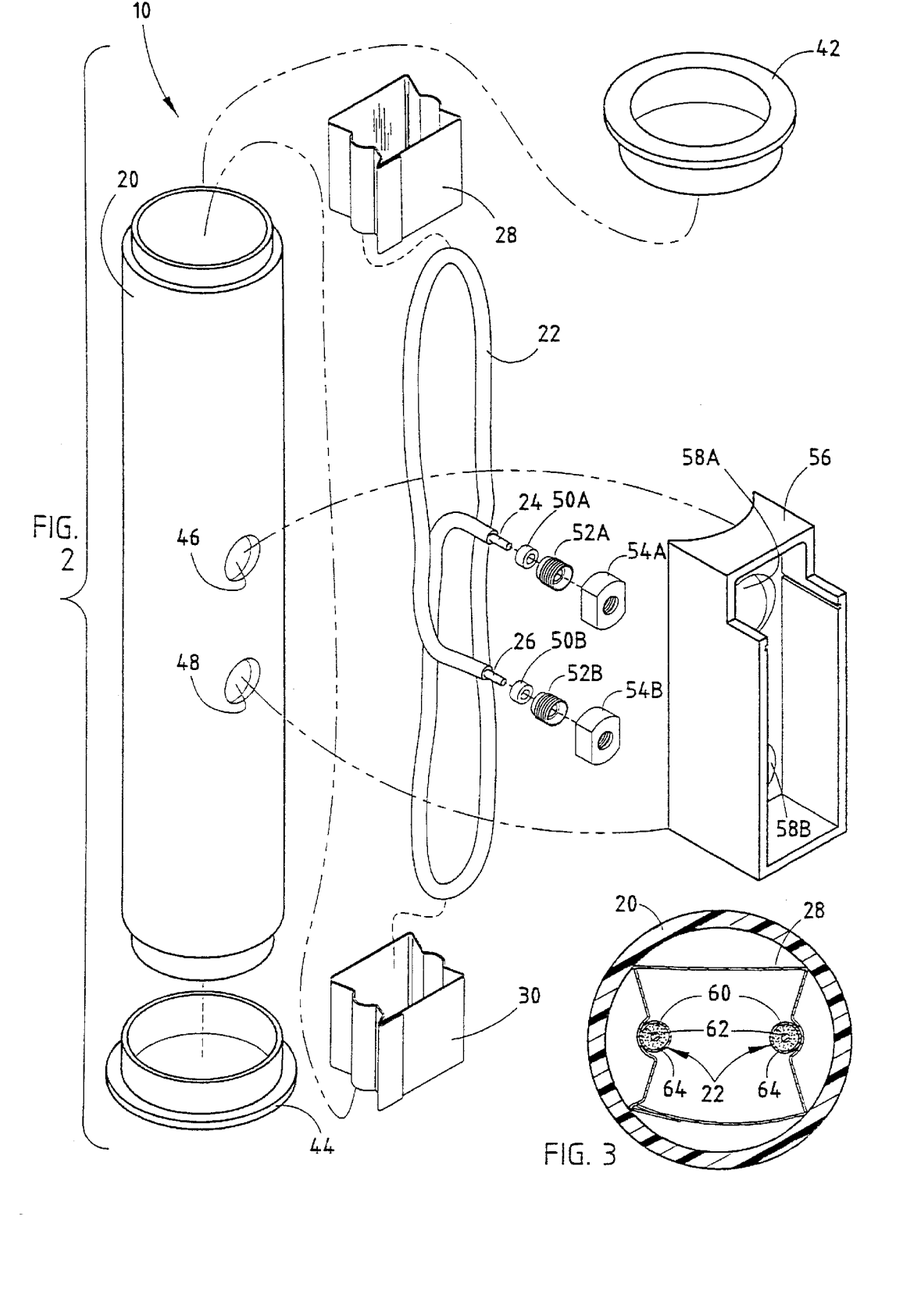
FIG. 2 is an exploded view of the electric water heater showing individual components of the water heater.
FIG. 3 is a cross-sectional view taken through lines 3—3 of FIG. 1.

Referring also to FIG. 2, the water heater 10 is further shown to include a pair of end fittings 42 and 44 at opposite ends of vessel 20. End fittings 42 and 44 are sealably engaged to vessel 20 and allow for sealing engagement with other connecting members such as a flexible hose or rigid polymeric vessel, which complete a continuous liquid passage. Vessel 20 further includes a pair of apertures 46 and 48 through which terminals 24 and 26 extend. Due to the use of a polymeric material, the vessel 20 is thermally isolated from terminals 24 and 26 by using a sealed compression fitting. The compression fitting includes a resilient gasket or seal 50A, preferably of a polymeric (e.g., rubber) material, in the shape of a ring surrounding the outer jacket of input terminal 24, and a polymeric coupler 52A is fitted over the top of ring seal 50A. Coupler 52A has a threaded outer surface for threadingly engaging a threaded surface on the inner walls of an outer polymeric member 54A. When threadedly engaged, the ring seal 50A is compressed between coupler 52A and member 54A to form a liquid seal.

Output terminal 26 is likewise thermally and electrically isolated from polymeric vessel 20 by way of a sealed compression fitting. The compression fitting includes a resilient gasket or ring seal 50B, preferably of a polymeric (e.g., rubber) material, disposed over the outer surface of the end of terminal 26, and a coupler 52B is fitted over ring seal 50B, and has a threaded outer surface for engaging a threaded inner surface of an outer polymeric member 54B. When threadedly engaged, the ring seal 50B is compressed between coupler 52B and member 54B to form a liquid seal. The sealed compression fittings advantageously are molded into the vessel body and are non-corrosive. An outer terminal housing 56 is disposed against the outer surface of vessel 20 and has a surface contoured to conform to the vessel housing. Terminal housing 36 likewise has apertures 58A and 58B for allowing terminal 24 and 26, respectively, to extend therethrough. Terminal housing 56 allows for electrical connections to be made to the input terminal 24 and output terminal 26 while protecting the terminal connections from the environment.

Metal support members 28 and 30 mechanically support and position the heating element 22 within the hollow of vessel 20 and prevent heating element 22 from contacting the polymeric walls of vessel 20 as mentioned herein. In addition, support members 28 and 30 are made of a conductive material, such as sheet metal, and provide a large surface area in contact with water flowing through the hollow of vessel 20, with the sheet metal extending in the direction of the flow of water so as not to impede water flowage. As is apparent in FIG. 3, the support member 28, as well as support member 30, is compressed against the inner walls of vessel 20 and is also in direct contact with the outer conductive jacket 64 of heating element 22. Shown in FIG. 3 is a cross section of the electrical heating element 22 which shows the inner conductive heating resistance wire 60 and outer conductive jacket 64 separated by a dielectric insulation layer 62 made of manganese dioxide or other suitable dielectric medium. In effect, support members 28 and 30 act as current collectors to collect any stray currents that are present in the water flowing through vessel 20. The support members 28 and 30 thereby provide a ground fault collector in the event that the inner conductive wire 60 of heating element 22 becomes exposed, which in effect may cause an electrical short in the heating element 22. It is common for hot tubs/spas and other hot water applications to include corrosive materials mixed in with the water which can cause corrosion to the heating element 22 over time. If excessive corrosion occurs to electrical heating element 22, it is possible that the inner conductive wire 60 could be exposed to the water flow. Stray currents are then collected by conductive support members 28 and 30, and transmitted to the outer conductive jacket 64 of heating element 22, which in turn is bonded or connected to the ground fault detector 36. The ground fault detector 36 provides a ground path, and further provides a ground fault detection signal to the controller 40 which responds to cutoff power supply to the heating element 22. Accordingly, support members 28 and 30 provide a ground fault detection circuit which advantageously reduces stray currents that may be present in a polymeric heating vessel and prevents further heating while the abnormal condition is present.

Figure 4:
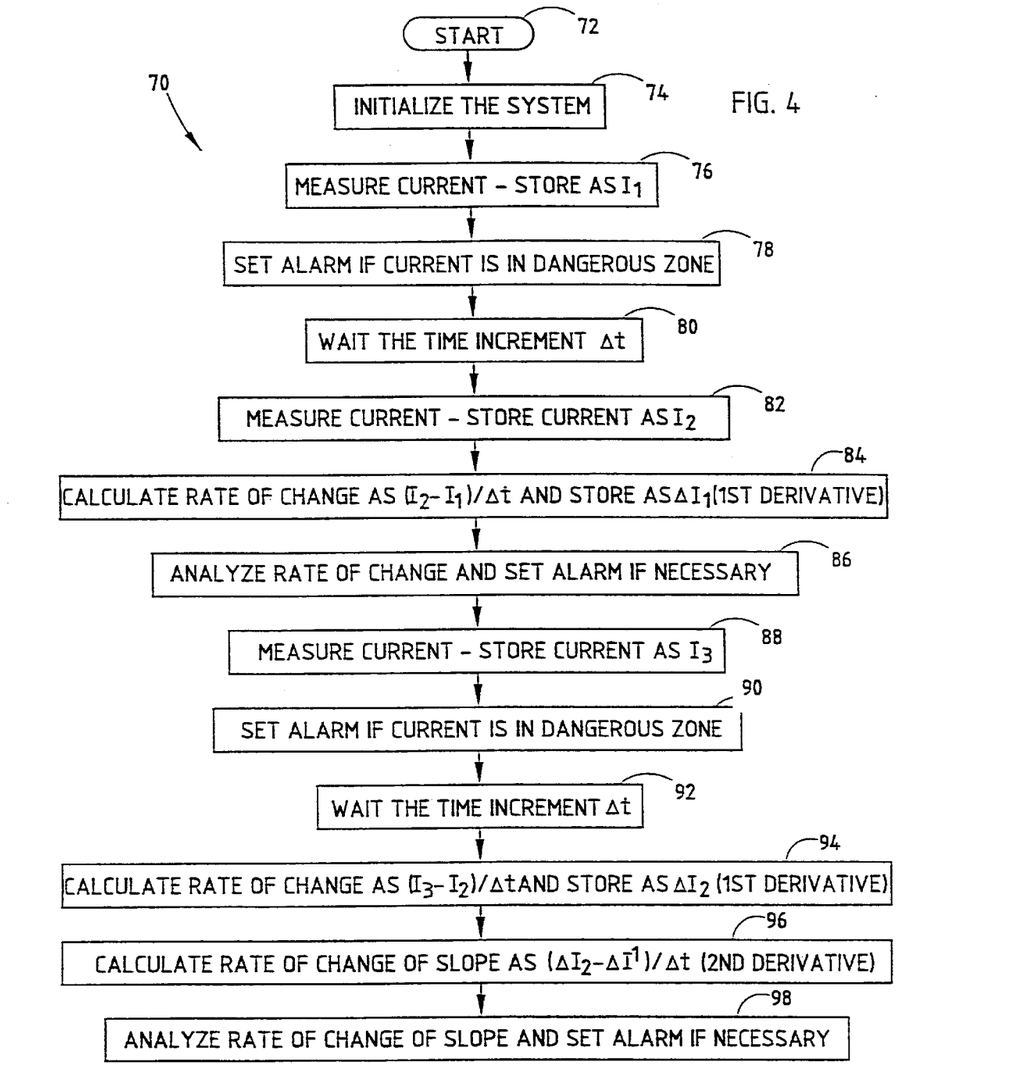
FIG. 4 is a flow diagram illustrating a methodology of controlling the water heater according to the water heater control system of the present invention.

The controller 40 is programmed to sense current flow through the electrical heating element 22, determine the effective resistance of the heating element, and take preemptive control to prevent damage from abnormal conditions based on changes that occur in the resistance. When the voltage input $V_{IN}$ supplied by power supply 32 is constant, the controller 40 could likewise use the sensed current value, which is inversely proportional to the resistance, to determine an abnormal condition. Referring to FIG. 4, a methodology 70 is provided which uses the current measurement to detect abnormal conditions and control the water heater 10, based on the assumption that the voltage input $V_{IN}$ is constant.

Methodology 40 starts with step 72 and proceeds to initialize the system in step 74. In step 76, methodology 70 measures the current sensed by current sensor 34 and stores the sensed current as current value $I_1$. Methodology 70 will set an alarm if the current $I_1$ is in the range identified as a danger zone. For example, if the current drops below 18 amps a potentially dangerous overheating condition may be present. As another example, if the current is greater than 25 amps a short circuit condition may exist. For either event, methodology 70 will initiate control action to cutoff power to the heater. In step 80, methodology 70 waits for a time increment $\Delta t$, and then proceeds to step 82 to measure a second current value which is stored as current value $I_2$. In step 84, methodology 70 calculates the rate of change of current according to the function $(I_2-I_1) \div \Delta t$, and stores this first derivative current value as $\Delta I_1$. The first derivative, or rate of change of current, is analyzed in step 86 and an alarm is set if the first derivative $\Delta I_1$ is outside an acceptable range.

Next, methodology 70 proceeds to measure a third current value which is stored as current value $I_3$ in step 88, and proceeds to step 90 to set an alarm if the third current value $I_3$ is in a danger zone. The danger zone defined for current value $I_3$ is the same or similar to the danger zone defined for current value $I_1$. Methodology 70 waits for a time increment $\Delta t$ in step 92 and then calculates a second rate of change of current according to the function $(I_3-I_2) \div \Delta t$, and stores the first derivative value as $\Delta I_2$ in step 94. In step 96, methodology 70 calculates the rate of change of slope of current as the second derivative according to the function $(\Delta I_2-\Delta I_1) \div \Delta t$. Methodology 70 then analyzes the rate of change of slope of current, i.e., the second derivative, and sets an alarm if necessary as set forth in step 98. For example, an alarm indicative of an abnormal condition may be set based on the current, the first derivative of the current, and the second derivative of current. Methodology 70 then returns to start step 72, and may repeat the control loop several times per second.

Accordingly, methodology 70 senses current, and calculates the first derivative and second derivative of current to determine if an abnormal condition is present. An abnormal condition may be present when abnormal flow rates occur, such as when a pump failure occurs, or if the heater is not completely submerged such that there is a lack of water flowing through the water heater 10. While methodology 70 have been described in connection with the use of sensed current, methodology 70 could likewise determine the resistance and first and second derivatives of resistance of the electrical heating element 22 to determine an abnormal condition. Once a certain abnormal condition is detected, the control the 40 responds to controller system as explained herein to take preemptive control action.

Figure 5:
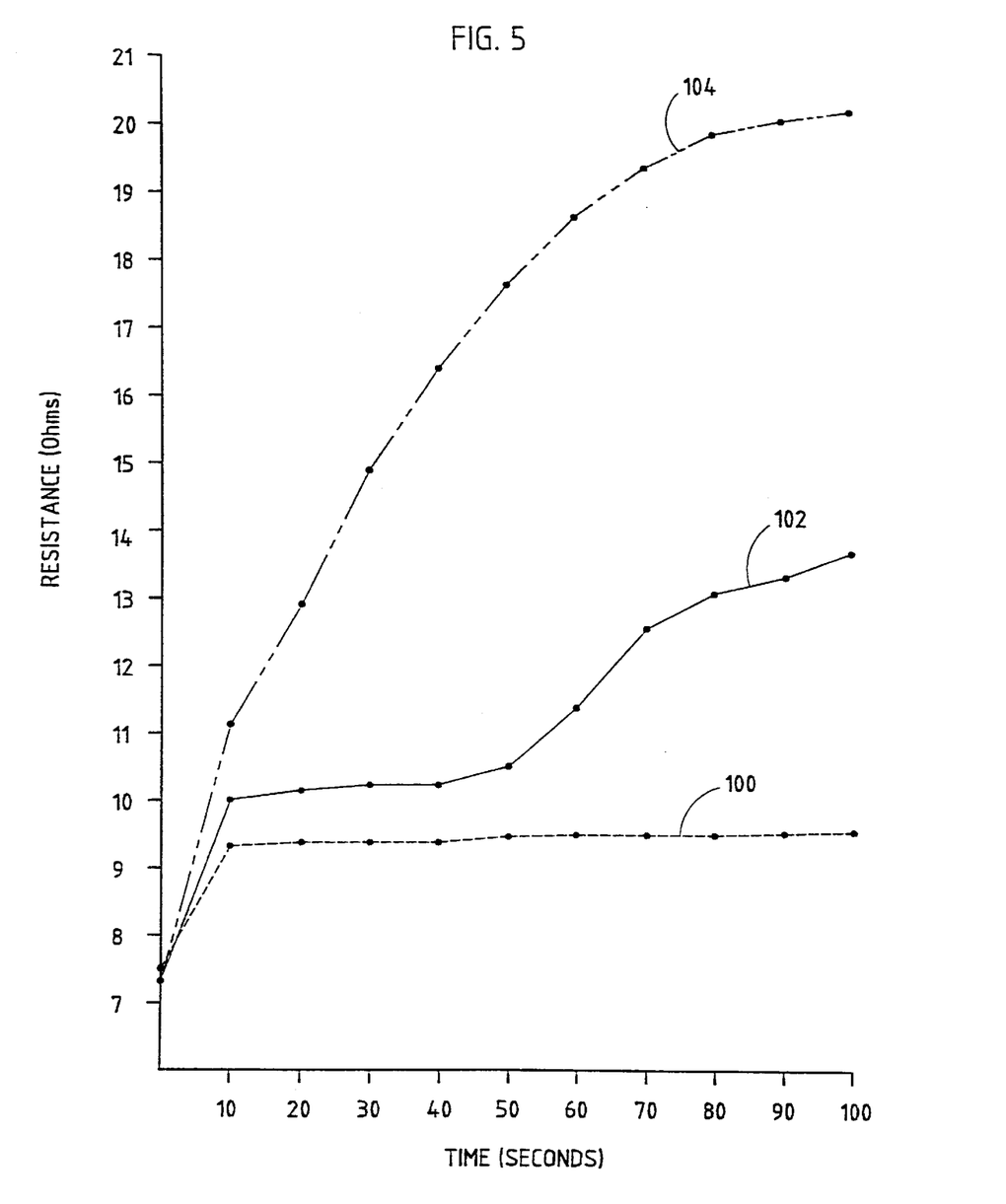
FIG. 5 is a graph illustrating sensed resistance of the heating element during a normal operating condition as compared to two abnormal conditions.

Referring to FIG. 5, comparative examples of measured resistance of the electric heating element 22 are plotted for each of three different conditions as a function of time. Line 100 represents the resistance measured during normal water flow operation. Line 102 indicates the measured resistance taken during an abnormal condition in which there is water present, but no water is flowing through the heater, such as when there is failure of the pump 14. Line 104 indicates the measured resistance taken during an abnormal low water condition in which there is little or no water present in the heater 10.

During the normal operating condition as shown by the example identified by line 100, the electrical heating element 22 initially increases in resistance and quickly levels off at a resistance of approximately 9.5 ohms. In contrast, it is shown that during an abnormal no-water-flow condition as shown by line 102, the resistance of the electrical heating element 22 rises to a higher resistance value and continues to rise over time. Moreover, during a dry heater condition as shown by line 104, the resistance of the electrical heating element rises even quicker and continues to rise to an extremely high resistance value, indicative of extreme temperatures. The heater controller of the present invention advantageously monitors the heating element energy in terms of resistance or current, and the first derivative and second derivative of the change in energy to determine the presence of certain abnormal conditions. In accordance with the example shown in FIG. 5, the controller may be configured to detect an abnormal condition and provide a suitable action as shown in Table 1 as follows:

TABLE 1

| R = Resistance (ohms) | $\Delta R/\Delta t$ | $\Delta R^2/\Delta t^2$ | Action |
|---|---|---|---|
| R > 10.56 | N/A | N/A | Remove power immediately |

TABLE 1-continued

| R = Resistance (ohms) | $\Delta R/\Delta t$ | $\Delta R^2/\Delta t^2$ | Action |
|---|---|---|---|
| R = 10.09 – 10.55 | >0 | >0 | Remove power immediately |
| R = 10.09 – 10.55 | $\geq 0$ | $\leq 0$ | Remove power after 3 consecutive samples |
| R = 10.09 – 10.55 | <0 | N/A | No action required |
| R = 9.12 – 10.08 | N/A | N/A | No action required |
| R = 9.11 – 8.63 | >0 | N/A | No action required |
| R = 9.11 – 8.63 | $\leq 0$ | $\geq 0$ | Remove power after 3 consecutive samples |
| R = 9.11 – 8.63 | <0 | <0 | Remove power immediately |
| R < 8.64 | N/A | N/A | Remove power immediately |

According to the above table, the detection of resistance exceeding a predetermined level of 10.56 ohms will result in the immediate removal of power to the heating element 22. In addition, when the measured resistance is in the range of 10.09 to 10.55 ohms and the first and second derivatives of resistance $\Delta R/\Delta t$ and $\Delta R^2/\Delta t^2$, respectively, are greater than zero, the controller 40 will likewise immediately remove power to the electrical heating element 22. For the same resistance value, if the first derivative is greater than or equal to zero and the second derivative is less than or equal to zero, the controller 40 will remove the power only after three consecutive samples show the present condition. In the event that the first derivative is less than zero, no action is taken as this is indicative of the resistance decreasing. When the resistance is in the range of 9.12 to 10.08 ohms, it is determined, according to this example, that no action is required as this is the desired resistance range of operation. When the resistance is within a lower range of 9.11 to 8.63 ohms and the first derivative is greater than zero, no action is likewise required. However, for the same range, when the first derivative is less than or equal to zero and the second derivative is greater than or equal to zero, the controller 40 will remove power only after three consecutive samples indicate this condition. Should the first and second derivatives both become less than zero for this range, the controller 40 will immediately remove power to the heating element 22. Likewise, should the resistance measured be less than 8.64 ohms, the controller 40 will immediately remove power to the electrical heating element 22, since this condition is indicative of a short circuit condition. Of course, the last condition of the resistance being less than 8.64 ohms will not be in effect until the heating element has time to stabilize, which according to the present example may require a time period of approximately one second.

Accordingly, the present invention advantageously provides for the control of a flow-through water heater 10 by quickly detecting the presence of an abnormal condition including a low water condition caused by a low water level, or a low flow condition caused by pump failure or blockage in the water circulation path. The present invention is capable of quickly detecting the abnormal condition in time to prevent damage from occurring to the system. As a result, the heater of the present invention advantageously allows for use of a polymeric housing. A polymeric housing further eliminates problems associated with corrosion of the vessel, particularly when used in systems having corrosive materials, such as corrosive salt systems, which are often present in hot tubs, spas and other applications. In addition, a polymeric housing is light in weight and more cost effective than conventional metallic housings.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A heater comprising:

a polymeric body having an elongated hollow, and an inlet opening and an outlet opening in communication with said hollow for flowing fluid therethrough;

an electrical resistance heater having a heating element of a material exhibiting a positive temperature coefficient of resistance, said heating element disposed in said hollow of said polymeric body and in heat transfer communication with fluid flowing through said hollow;

an input terminal for receiving electrical power and supplying said electrical power to said heating element to produce a current in said heating element to generate heat; and a controller for sensing current flow through said heating element and determining a resistance related value of said heating element, said controller further determining a first derivative of said resistance related value as a function of time and controlling the electrical power supplied to said heating element as a function of said first derivative so that the controller prevents overheating of the polymeric body.

2. The heater as defined in claim 1, wherein said controller further computes a second derivative of said resistance related value as a function of time, said controller reducing electrical power supplied to said heating element as a function of said second derivative.

3. The heater as defined in claim 1 further comprising a pump for causing fluid to flow through said hollow of said polymeric body in heat transfer communication with said heating element.

4. The heater as defined in claim 1, wherein said polymeric body further has a first aperture formed therein for allowing a first terminal of said heating element to extend therethrough, and a compressed fitting disposed in said first aperture in a sealed relation between said polymeric body and said first terminal of said heating element.

5. The heater as defined in claim 4, wherein said polymeric body further has a second aperture formed therein for receiving a second terminal of said heating element, and a compressed fitting disposed in said second aperture in a sealed relation between said polymeric body and said second terminal of said heating element.

6. The heater as defined in claim 1 further comprising a conductive mounting member disposed in the hollow against inner walls of said polymeric body and in contact with said heating element, said conductive mounting member being in electrical contact with an outer conductive jacket of said heating element, wherein said conductive mounting member is adapted to collect stray currents and couple said stray currents to a ground fault detector for detecting a ground fault.

7. The heater as defined in claim 6, wherein said conductive mounting member mechanically engages said heating element to position said heating element within said hollow in the polymeric body and out of contact with said polymeric body.

8. The heater as defined in claim 1, wherein said fluid comprises water.

9. A water heater comprising:

a body having an elongated hollow, and an inlet opening and an outlet opening in communication with said hollow for flowing fluid therethrough;

an electrical resistance heater having a heating element of a material exhibiting a positive temperature coefficient of resistance, said heating element disposed in said hollow of said body and in heat transfer communication with fluid flowing through said hollow;

an input terminal for receiving electrical power and supplying said electrical power to said heating element to produce a current in said heating element to generate heat; and a controller for sensing current flow through said heating element and determining a resistance related value of said heating element, said controller further determining a first derivative of said resistance related value as a function of time and a second derivative of said resistance related value as a function of time, and controlling said electrical power supplied to said heating element as a function of said first and second derivatives.

10. The heater as defined in claim 9, wherein said controller controls the electrical power supply to said heating element further as a function of absolute resistance.

11. The heater as defined in claim 9, wherein said controller cuts off said electrical power supplied to said heating element as a function of said first and second derivatives of said resistance related value.

12. The heater as defined in claim 9, wherein said resistance related value comprises resistance of said heating element.

13. The heater as defined in claim 9, wherein said resistance related value comprises current.

14. The heater as defined in claim 9 further comprising a temperature sensor disposed in said fluid for measuring temperature of said fluid, wherein said controller controls said heating element as a function of said sensed temperature.

15. The heater as defined in claim 9, wherein said body comprises a polymeric body.

16. The heater as defined in claim 15, wherein said polymeric body has a first aperture for allowing a first terminal of said heating element to extend therethrough, and a compressed fitting disposed in said first aperture in sealed relation between said polymeric body and said heating element.

17. The heater as defined in claim 9 further comprising a conductive mounting member disposed in the hollow in said polymeric body and in electrical contact with said heating element, said conductive mounting member being in electrical contact with an outer conductive jacket of said heating element and adapted to collect and couple stray current to a ground fault detector via said conductive shield.

18. The heater as defined in claim 17, wherein said conductive mounting member further engages said heating element to position said heating element within the hollow in the polymeric body and out of contact with the polymeric body.

19. A heater comprising:

a polymeric body having an elongated hollow, and an inlet opening and outlet opening in communication with said hollow for flowing fluid therethrough;

an electrical heater having a heating element disposed in said hollow of said polymeric body and in heat transfer communication with fluid flowing through said hollow said heating element having an inner conductor and an outer conductive jacket separated by a dielectric material;

an input terminal for receiving electrical power and supplying said electrical power to said heating element to produce a current in said heating element to generate heat;

a conductive member disposed in said hollow and in contact with said outer conductive jacket of said heating element for collecting stray currents in said fluid;

a ground fault detector in electrical contact with said outer conductive jacket for detecting a ground fault condition; and a controller for controlling the electrical power to said heating element, said controller controlling said electrical power supplied to said heating element based on said ground fault detection.

20. The heater as defined in claim 19, wherein said conductive member mechanically supports and positions said electrical heating element within said hollow of said polymeric body.

21. A heater comprising:

a body having an elongated hollow, and an inlet opening and an outlet opening in communication with said hollow for flowing fluid therethrough;

a heater disposed in said hollow of said body and in heat communication with fluid flowing through said hollow;

an input for receiving power and supplying said power to said heater to generate heat;

a sensor for sensing a temperature dependent value indicative of temperature of said fluid; and a controller for determining a first derivative of said temperature dependent value as a function of time and a second derivative of said temperature dependent value as a function of time, and controlling said power supplied to said heater as a function of said first and second derivatives.

22. A method of controlling a heating comprising:

sensing current flow through a heater element that is disposed in a hollow of a body having an inlet and an outlet in communication with the hollow flowing fluid therethrough, said heating element having a material exhibiting a positive temperature coefficient of resistance and providing heat transfer with fluid flowing through said hollow;

determining a resistance related value of said heating element as a function of said sensed current;

determining a first derivative of said resistance related value as a function of time;

determining a second derivative of said resistance related value as a function of time; and controlling electrical power supplied to said heating element as a function of said first and second derivatives.

23. The method as defined in claim 22, wherein said step of controlling said electrical power supplied to said heating element is further supplied as a function of absolute resistance.

24. The method as defined in claim 22, wherein said step of controlling said electrical power supplied includes cutting off power supplied to said heating element as a function of said first and second derivatives of said resistance related value.

25. The method as defined in claim 22, wherein said resistance related value comprises current.

26. The method as defined in claim 22, wherein said resistance related value comprises resistance.

* * * * *

UNITED STATES PATENT AND TRADEMARK OFFICE
CERTIFICATE OF CORRECTION

PATENT NO.   : 6,080,973
DATED        : June 27, 2000
INVENTOR     : Carlisle Thweatt, Jr.

It is certified that error appears in the above-identified patent and that said Letters Patent is hereby corrected as shown below:

Column 10, claim 22, line 35;
   "heating" should be --heater--.

Column 10, claim 22, line 36;
   "heater" should be --heating.

Signed and Sealed this

Seventeenth Day of April, 2001

Attest:

NICHOLAS P. GODICI

Attesting Officer     Acting Director of the United States Patent and Trademark Office